(12) United States Patent
Yoon et al.

(10) Patent No.: US 9,186,621 B2
(45) Date of Patent: Nov. 17, 2015

(54) HYDROGEN ION TRANSPORT MEMBRANE, MEMBRANE FOR GENERATING HYDROGEN, AND METHOD FOR MANUFACTURING SAME

(75) Inventors: Kyung Byung Yoon, Seoul (KR); Hyun Sung Kim, Seoul (KR)

(73) Assignee: Sogang University Research Foundation, Seoul (KR)

( * ) Notice: Subject to any disclaimer, the term of this patent is extended or adjusted under 35 U.S.C. 154(b) by 123 days.

(21) Appl. No.: 14/111,673

(22) PCT Filed: Apr. 12, 2012

(86) PCT No.: PCT/KR2012/002746
§ 371 (c)(1),
(2), (4) Date: Dec. 30, 2013

(87) PCT Pub. No.: WO2012/141492
PCT Pub. Date: Oct. 18, 2012

(65) Prior Publication Data
US 2014/0127093 A1    May 8, 2014

(30) Foreign Application Priority Data

Apr. 14, 2011   (KR) .................. 10-2011-0034590

(51) Int. Cl.
*B01D 53/22*     (2006.01)
*B01J 37/02*     (2006.01)
(Continued)

(52) U.S. Cl.
CPC ............ *B01D 53/22* (2013.01); *B01D 69/10* (2013.01); *B01D 69/145* (2013.01); *B01J 15/005* (2013.01); *B01J 37/00* (2013.01); *B01J 37/0242* (2013.01); *C01B 3/042* (2013.01); *C01B 3/503* (2013.01);
(Continued)

(58) Field of Classification Search
CPC ...... B01D 53/22; B01D 69/10; B01D 69/145; B01D 71/36; B01D 71/52; C01B 3/042; C01B 3/503; C01B 3/505; C01B 2203/0405; C01B 2203/061; C01B 2203/066; C01B 2203/068; B01J 37/00; B01J 37/0242; B01J 15/005; H01M 8/02; H01M 8/0204; H01M 8/0221; H01M 8/0687; Y02E 60/364
USPC ................. 96/4, 7, 9, 11; 95/55, 56
See application file for complete search history.

(56) References Cited

U.S. PATENT DOCUMENTS 5,753,014 A * 5/1998 Van Rijn ..................... 96/12
2003/0233940 A1* 12/2003 Takatani et al. ............... 96/4
(Continued)

FOREIGN PATENT DOCUMENTS

JP    2010-119921    *  6/2010    ............ B01D 71/02
KR    10-2007-0088931  *  8/2007    ............ H01M 8/02
(Continued)

OTHER PUBLICATIONS

International Search Report issued in International App. No. PCT/KR2012/002746, mailed Nov. 30, 2012.

*Primary Examiner* — Jason M Greene
(74) *Attorney, Agent, or Firm* — Greer Burns & Crain Ltd.

(57) ABSTRACT

The present application relates to a hydrogen ion transport membrane, which is formed by using a porous thin film having a plurality of holes which are regularly aligned, a membrane for generating hydrogen, and a method for manufacturing the hydrogen ion transport membrane and the membrane for generating hydrogen.

16 Claims, 16 Drawing Sheets

(51) Int. Cl.
  B01J 37/00   (2006.01)
  B01J 15/00   (2006.01)
  B01D 69/10   (2006.01)
  B01D 69/14   (2006.01)
  C01B 3/50    (2006.01)
  C01B 3/04    (2006.01)
  *B01D 71/36*     (2006.01)
  *B01D 71/52*     (2006.01)

(52) U.S. Cl.
  CPC ............... *C01B 3/505* (2013.01); *B01D 71/36* (2013.01); *B01D 71/52* (2013.01); *C01B 2203/0405* (2013.01); *C01B 2203/061* (2013.01); *C01B 2203/066* (2013.01); *C01B 2203/068* (2013.01); *Y02E 60/364* (2013.01)

(56) References Cited

U.S. PATENT DOCUMENTS

| | | | |
|---|---|---|---|
| 2004/0245191 A1 * | 12/2004 | Yagi et al. | 210/791 |
| 2006/0283701 A1 * | 12/2006 | Li et al. | 204/157.52 |
| 2007/0119706 A1 * | 5/2007 | McNulty et al. | 204/252 |
| 2008/0251012 A1 * | 10/2008 | Tabata et al. | 118/638 |
| 2010/0160466 A1 * | 6/2010 | Elabd et al. | 521/27 |
| 2012/0237842 A1 * | 9/2012 | Suzuki et al. | 429/423 |

FOREIGN PATENT DOCUMENTS

| | | | |
|---|---|---|---|
| KR | 10-2007-0088931 | 7/2009 | |
| WO | WO 2009/153380 A1 * | 12/2009 | H01M 8/02 |

\* cited by examiner

FIG. 8
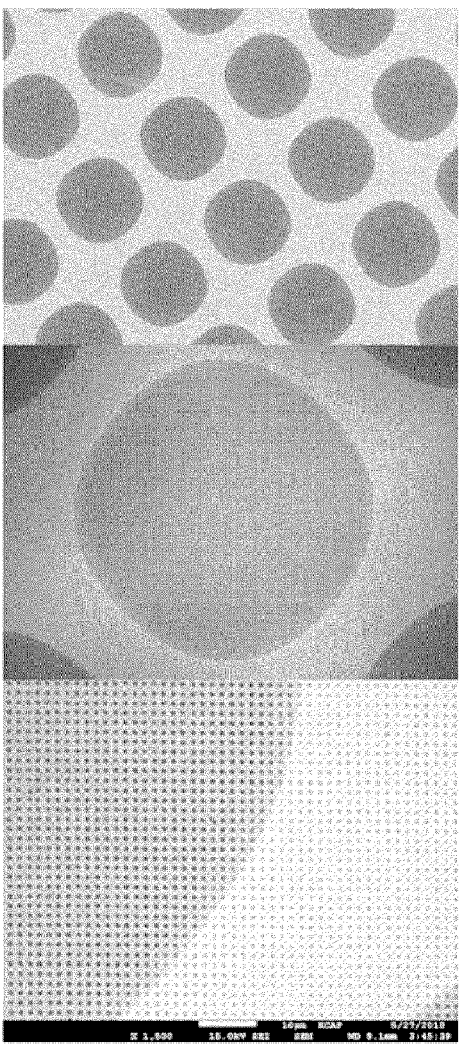
Before CdS sputtering
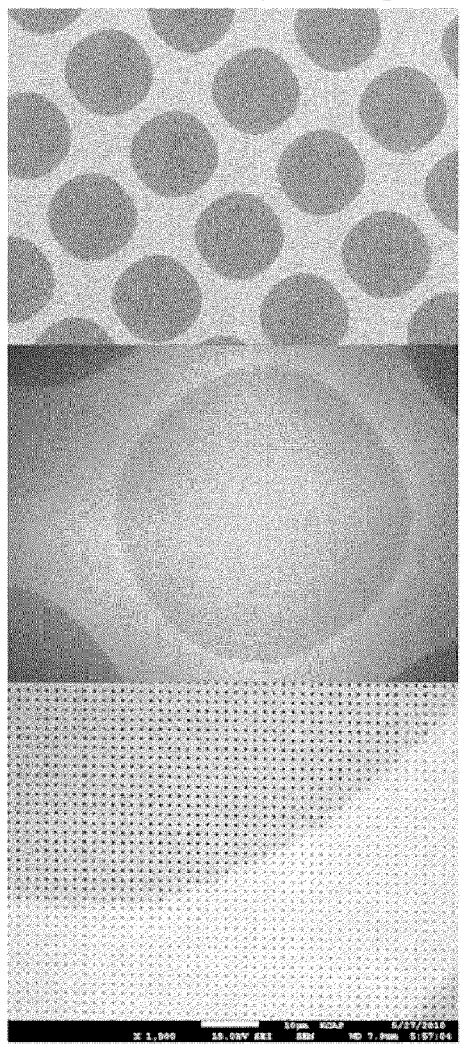
After CdS sputtering

HYDROGEN ION TRANSPORT MEMBRANE, MEMBRANE FOR GENERATING HYDROGEN, AND METHOD FOR MANUFACTURING SAME

TECHNICAL FIELD

The present disclosure relates to a membrane for transporting hydrogen ion, which is made of a porous thin film including a plurality of holes which are regularly aligned, a membrane for producing hydrogen, and a preparing method thereof.

BACKGROUND ART

Hydrogen is used as a raw material for producing ammonia, methanol, and the like and also used as an essential material of hydrogenation for producing a saturated compound. Further, if used as a main material of fuel cells as one of clean alternative energy, hydrogen can be an alternative to current fossil fuel and thus has been highly anticipated as a future energy source.

Conventionally, hydrogen has been produced by a method of reforming fossil fuel such as naphtha and natural gas, a method of bringing iron into contact with steam at a high temperature, a method of making a reaction between alkali metal and water, a method of electrolyzing water, and the like.

However, these methods basically require a lot of energy and thus cannot be said as economical methods. In particular, the method of reforming fossil fuel has a problem of generating a large amount of carbon dioxide, and the method of electrolyzing water has a problem of short-life electrodes and a problem in processing oxygen generated. Due to the above-described problems, it actually costs much to complete the facilities for producing hydrogen.

Thus, in recent years, a method of directly converting water or organic materials into hydrogen with solar energy by photolysis has been studied as one of methods for producing hydrogen an alternative to fossil fuel. This method is a key technology capable of securing the most desirable eco-friendly energy system.

DISCLOSURE OF THE INVENTION

Problems to be Solved by the Invention

In view of the foregoing, the present disclosure provides a membrane for transporting hydrogen ion formed of a porous thin film including a plurality of holes which are regularly aligned, a membrane for producing hydrogen, and a preparing method thereof.

However, problems to be solved by the present disclosure may not be limited to the above-described problems. Although not described herein, other problems to be solved by the present disclosure can be clearly understood by those skilled in the art from the following descriptions.

Means for Solving the Problems

In accordance with one aspect of the present disclosure, there is provided a membrane for transporting hydrogen ion, comprising: a porous thin film including a plurality of holes which are regularly aligned; and a hydrogen ion transporting material introduced into the holes of the porous thin film.

In accordance with another aspect of the present disclosure, there is provided a membrane for producing hydrogen, comprising: a photocatalytic layer including a plurality of holes which are regularly aligned; a hydrogen ion transporting material introduced into the holes of the photocatalytic layer; and a co-catalyst layer formed on a part except the holes of the photocatalytic layer.

In accordance with still another aspect of the present disclosure, there is provided a preparing method of a membrane for producing hydrogen, comprising: forming a porous thin film including a plurality of holes which are regularly aligned on a substrate; forming a photocatalytic layer on a part except the holes of the porous thin film; forming a co-catalyst layer on a part except holes of the photocatalytic layer; and introducing a hydrogen ion transporting material into the holes of the photocatalytic layer to form a membrane for producing hydrogen.

In accordance with still another aspect of the present disclosure, there is provided a preparing method of a membrane for producing hydrogen, comprising: forming a porous thin film including a plurality of holes which are regularly aligned on a substrate; forming a photocatalytic layer on a part except the holes of the porous thin film; introducing a hydrogen ion transporting material into holes of the photocatalytic layer; and forming a co-catalyst layer on a part except the holes of the photocatalytic layer to form a membrane for producing hydrogen.

In accordance with still another aspect of the present disclosure, there is provided a cell for producing hydrogen, comprising: the above-described membrane for producing hydrogen of the present disclosure.

In accordance with still another aspect of the present disclosure, there is provided an apparatus for artificial photosynthesis, comprising: the above-described membrane for producing hydrogen of the present disclosure.

Effect of the Invention

In accordance with the present disclosure, a membrane for transporting hydrogen ion and a membrane for producing hydrogen can be prepared by a simple process using a porous thin film including a plurality of holes. Further, each of the membrane for transporting hydrogen ion and the membrane for producing hydrogen has a two-dimensional porous thin film structure regularly aligned and thus can improve efficiency of transporting hydrogen ion and efficiency of producing hydrogen. Therefore, the membrane for transporting hydrogen ion and the membrane for producing hydrogen of the present disclosure can be used in various catalytic reactions, solar cells, and fuel cells and can also be used particularly in a hydrogen producing reaction using water photolysis or an artificial photosynthesis reaction.

BRIEF DESCRIPTION OF THE DRAWINGS

FIG. 8 is SEM images showing a porous thin film including holes before and after a photocatalytic layer is deposited thereon in accordance with an example of the present disclosure.

BEST MODE FOR CARRYING OUT THE INVENTION

Figure 1:
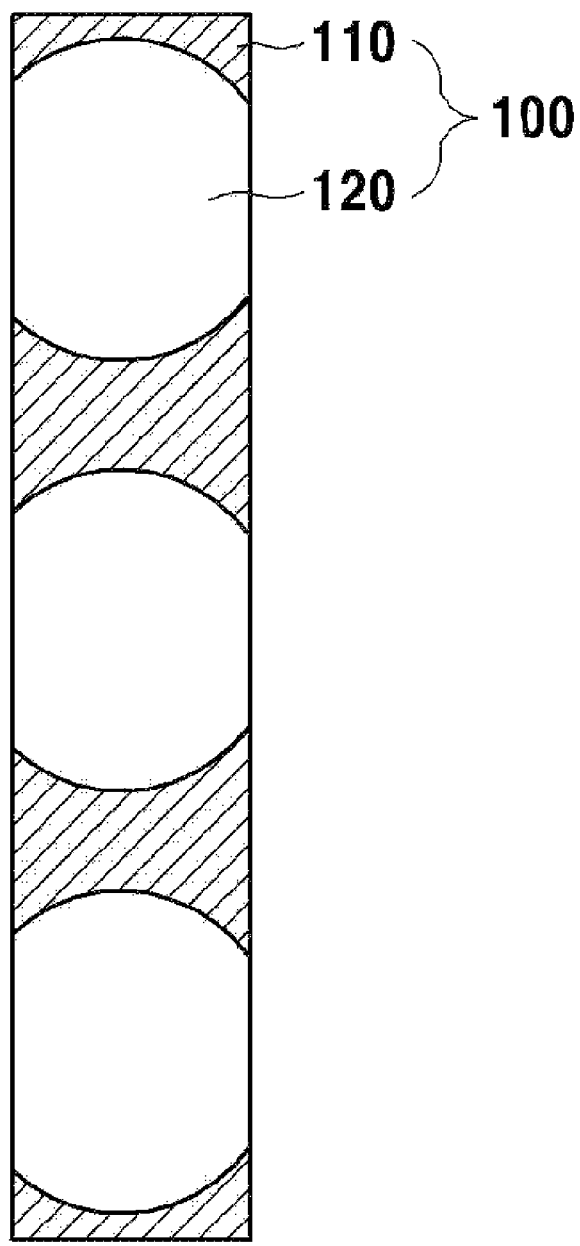
FIG. 1 is a cross-sectional view of a membrane for transporting hydrogen ion in accordance with an illustrative embodiment of the present disclosure.

Through the whole document, the term "comprises or includes" and/or "comprising or including" used in the document means that one or more other components, steps, operation and/or existence or addition of elements are not excluded in addition to the described components, steps, operation and/or elements unless context dictates otherwise.

The term "about or approximately" or "substantially" used in the document is intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for".

The term "hole" used in the document means a cavity in various forms including at least an opening in part.

In accordance with one aspect of the present disclosure, there is provided a membrane for transporting hydrogen ion, including: a porous thin film including a plurality of holes which are regularly aligned; and a hydrogen ion transporting material introduced into the holes of the porous thin film.

In accordance with an illustrative embodiment, the hydrogen ion transporting material may be appropriately employed from materials publicly known in the art as having hydrogen ion conductivity without specific limitation, and may include, for example, but may not be limited to, an organic polymer having hydrogen ion conductivity, an inorganic polymer having hydrogen ion conductivity, or an organic-inorganic hybrid polymer having hydrogen ion conductivity. By way of example, the hydrogen ion transporting material may include, but may not be limited to, NAFION® or polyether ether ketone (PEEK).

In accordance with another illustrative embodiment, the membrane for transporting hydrogen ion may further include, but may not be limited to, a porous substrate beneath the porous thin film. In an exemplary embodiment, holes in the porous substrate may be larger than the holes of the porous thin film, but the present disclosure may not be limited thereto. In an exemplary embodiment, the porous substrate may include, but may not be limited to, a glass, a fused silica wafer, a silicon wafer, or a photoresist.

In accordance with still another illustrative embodiment, a side of the hole of the porous thin film may have a form in, but may not be limited to, a straight or curved shape.

In accordance with still another illustrative embodiment, a size of the hole of the photocatalytic layer may be, but may not be limited to, from about 10 nm to about 100 µm. By way of example, a size of the hole of the photocatalytic layer may be, but may not be limited to, a diameter of the hole. By way of example, a size of the hole of the photocatalytic layer may be, but may not be limited to, from about 10 nm to about 100 µm, or from about 10 nm to about 10 µm, or from about 10 nm to about 1 µm, or from about 100 nm to about 100 µm, or from about 100 nm to about 10 µm, or from about 100 nm to about 1 µm.

In accordance with still another illustrative embodiment, the porous thin film may include, but may not be limited to, an organic thin film, an inorganic thin film, or an organic-inorganic hybrid thin film.

In accordance with still another illustrative embodiment, the porous thin film may have, but may not be limited to, at least two types of holes which are different from each other in terms of a shape and/or a size.

In accordance with another aspect of the present disclosure, there is provided a membrane for producing hydrogen, including: a photocatalytic layer including a plurality of holes which are regularly aligned; a hydrogen ion transporting material introduced into the holes of the photocatalytic layer; and a co-catalyst layer formed on a part except the holes of the photocatalytic layer.

The membrane for producing hydrogen can be used in a reaction for producing hydrogen using a photocatalyst.

In accordance with an illustrative embodiment, the membrane for producing hydrogen can be used in a reaction for producing hydrogen by water photolysis or photooxidation using a photocatalyst. By way of example, if light is irradiated to one side of the photocatalytic layer (for example, one side of the photocatalytic layer on which the co-catalyst layer is not formed) of the membrane for producing hydrogen by using a reaction system in which the membrane for producing hydrogen is provided in water, the water is photocatalytically decomposed into protons and electrons by the photocatalytic layer included in the membrane for producing hydrogen. The protons (hydrogen ions) are transferred to the co-catalyst layer on the other side of the membrane for producing hydrogen through the hydrogen ion transporting material of the membrane for producing hydrogen, and the generated electrons are also transferred to the co-catalyst layer, so that the protons and the electrons are recombined to produce hydrogen. The irradiated light may be, but may not be limited to, ultraviolet light, visible light, or infrared light.

In accordance with another illustrative embodiment, the membrane for producing hydrogen can be used in a reaction for producing hydrogen from an aqueous solution using a hydrogen ion source material. By way of example, if light is irradiated to the membrane for producing hydrogen, electrons and positive holes are generated in the photocatalytic layer of the membrane. A hydrogen ion source positioned at one side of the membrane produces hydrogen ions by the positive holes. The hydrogen ions produced as such are transferred to the other side of the membrane through the hydrogen ion transporting material of the membrane, and the electrons generated in the photocatalytic layer are separated and transferred to the other side of the membrane through the photocatalytic layer and/or the co-catalyst layer of the membrane. The transferred hydrogen ions are combined with the transferred electrons to produce hydrogen on the other side of the membrane through a reduction reaction. The hydrogen ion source may include water or an organic material. By way of example, the organic material may include, but may not be limited to, organic acids such as a formic acid, an acetic acid, and the like.

In accordance with an illustrative embodiment, the photocatalytic layer may include any photocatalytic material without specific limitation as long as it has a photo active property and has the activity of oxidizing water under light irradiation to produce oxygen and generate protons and electrons at the same time. The photocatalytic material may be employed from materials publicly known in the art as having the above-described activity without specific limitation, and may include, but may not be limited to, one selected from the group consisting of metals, semiconductors, alloys, and combinations thereof that absorb visible light or ultraviolet light.

In accordance with another illustrative embodiment, the co-catalyst layer may include any material without specific limitation as long as it serves as a co-catalyst for water photolysis using the photocatalytic material. By way of example, the co-catalyst may include any material without specific limitation as long as it can promote separation of protons and electrons generated by oxidizing water by the photocatalytic material under light irradiation and transfer the protons and/or the electrons. Otherwise, by way of example, the co-catalyst may include any material without specific limitation as long as it has the activity of transferring protons and electrons generated by oxidizing water by the photocatalytic material under light irradiation and reducing the protons to hydrogen.

By way of example, the co-catalyst layer may include, but may not be limited to, a metal or an alloy including a member selected from the group consisting of Pt, Pd, Rh, Au, Ni, Cr, Ag, Cu, W, Mo, Nb, V, Ru, Sn, Zr, Co, Fe, Ta, and combinations thereof.

In accordance with still another illustrative embodiment, the hydrogen ion transporting material may be appropriately employed from materials publicly known in the art as having hydrogen ion conductivity without specific limitation, and may include, for example, but may not be limited to, an organic polymer having hydrogen ion conductivity, an inorganic polymer having hydrogen ion conductivity, or an organic-inorganic hybrid polymer having hydrogen ion conductivity. By way of example, the hydrogen ion transporting material may include, but may not be limited to, NAFION® or polyether ether ketone (PEEK).

In accordance with still another illustrative embodiment, the membrane for producing hydrogen may further include, but may not be limited to, a porous substrate beneath the photocatalytic layer. In an exemplary embodiment, holes in the porous substrate may be larger than the holes of the photocatalytic layer, but the present disclosure may not be limited thereto. In another exemplary embodiment, the porous substrate may include, but may not be limited to, a glass, a fused silica wafer, a silicon wafer, or a photoresist.

In accordance with still another illustrative embodiment, a size of the hole of the photocatalytic layer may be, but may not be limited to, from about 10 nm to about 100 µm. By way of example, a size of the hole of the photocatalytic layer may be, but may not be limited to, a diameter of the hole. By way of example, a size of the hole of the photocatalytic layer may be, but may not be limited to, from about 10 nm to about 100 µm, or from about 10 nm to about 10 µm, or from about 10 nm to about 1 µm, or from about 100 nm to about 100 µm, or from about 100 nm to about 10 µm, or from about 100 nm to about 1 µm.

In accordance with still another aspect of the present disclosure, there is provided a preparing method of a membrane for producing hydrogen, including: forming a porous thin film including a plurality of holes which are regularly aligned on a substrate; forming a photocatalytic layer on a part except the holes of the porous thin film; forming a co-catalyst layer on a part except holes of the photocatalytic layer; and introducing a hydrogen ion transporting material into the holes of the photocatalytic layer to form a membrane for producing hydrogen.

In accordance with still another illustrative embodiment, the photocatalytic layer may have, but may not be limited to, at least two types of holes which are different each other in terms of a shape and/or a size.

In accordance with still another aspect of the present disclosure, there is provided a preparing method of a membrane for producing hydrogen, including: forming a porous thin film including a plurality of holes which are regularly aligned on a substrate; forming a photocatalytic layer on a part except the holes of the porous thin film; introducing a hydrogen ion transporting material into holes of the photocatalytic layer; and forming a co-catalyst layer on a part except the holes of the photocatalytic layer to form a membrane for producing hydrogen.

In the preparing method of a membrane for producing hydrogen of the present disclosure, a sequence of the forming a photocatalytic layer on a part except the holes of the porous thin film and the introducing a hydrogen ion transporting material into holes of the photocatalytic layer is not specifically limited, and the two processes may be carried out in reverse order.

In accordance with an illustrative embodiment, the preparing method of a membrane for producing hydrogen may further include, but may not be limited to, separating the formed membrane for producing hydrogen from the porous thin film.

In accordance with another illustrative embodiment, the preparing method may further include, but may not be limited to, etching a part of the porous thin film beneath the photocatalytic layer before forming the membrane for producing hydrogen.

In accordance with still another illustrative embodiment, the photocatalytic layer may include any photocatalytic material without specific limitation as long as it has a photo active property and has the activity of oxidizing water under light irradiation to produce oxygen and generate protons and electrons at the same time. The photocatalytic material may be employed from materials publicly known in the art as having the above-described activity without specific limitation, and may include, but may not be limited to, one selected from the group consisting of metals, semiconductors, alloys, and combinations thereof that absorb visible light or ultraviolet light.

In accordance with still another illustrative embodiment, the co-catalyst layer may include any material without specific limitation as long as it serves as a co-catalyst for water photolysis using the photocatalytic material. By way of example, the co-catalyst may include any material without specific limitation as long as it can promote separation of protons and electrons generated by oxidizing water by the photocatalytic material under light irradiation and transfer the protons and/or the electrons. Otherwise, by way of example, the co-catalyst may include any material without specific limitation as long as it has the activity of transferring protons and electrons generated by oxidizing water by the photocatalytic material under light irradiation and reducing the protons to hydrogen.

By way of example, the co-catalyst layer may include, but may not be limited to, a metal or an alloy including a member selected from the group consisting of Pt, Pd, Rh, Au, Ni, Cr, Ag, Cu, W, Mo, Nb, V, Ru, Sn, Zr, Co, Fe, Ta, and combinations thereof.

In accordance with still another illustrative embodiment, the substrate may include, but may not be limited to, a porous substrate.

In accordance with still another illustrative embodiment, the preparing method may further include, but may not be limited to, repeating forming the porous thin film including the plurality of holes which are regularly aligned on the substrate; forming the photocatalytic layer on a part except the holes of the porous thin film; forming the co-catalyst layer on a part except the holes of the photocatalytic layer; and introducing a hydrogen ion transporting material in the holes of the photocatalytic layer, to form a plurality of the membranes for producing hydrogen, then stacking the membranes for producing hydrogen to form a multi-layered membrane for producing hydrogen. The membrane for producing hydrogen and the preparing method thereof may include all the descriptions about the membrane for transporting hydrogen ion, and redundant descriptions thereof will be omitted for convenience.

In accordance with still another illustrative embodiment, the photocatalytic layer may include, but may not be limited to, a member selected from the group consisting of a metal, a semiconductor, an alloy, and combinations thereof absorbing visible light or ultraviolet light.

In accordance with still another aspect of the present disclosure, there is provided a cell for producing hydrogen, including the above-described membrane for producing hydrogen of the present disclosure.

In accordance with still another aspect of the present disclosure, there is provided an apparatus for artificial photosynthesis, including the above-described membrane for producing hydrogen of the present disclosure.

The cell for producing hydrogen and the apparatus for artificial photosynthesis may include all the descriptions about the membrane for transporting hydrogen ion and the membrane for producing hydrogen, and redundant descriptions thereof will be omitted for convenience.

Hereinafter, illustrative embodiments and examples of the present disclosure will be explained in detail with reference to the accompanying drawings so that the present disclosure may be readily implemented by those skilled in the art.

However, it is to be noted that the present disclosure may not be limited to the illustrative embodiments and examples but can be embodied in various other ways. In drawings, parts irrelevant to the description are omitted for simplicity of explanation, and like reference numerals denote like parts through the whole document. Hereinafter, the present disclosure will be explained in detail by using illustrative embodiments and examples with reference to the accompanying drawings, but the present disclosure may not be limited thereto.

In accordance with an illustrative embodiment, a membrane for transporting hydrogen ion 100 includes, as depicted in FIG. 1, a porous thin film 110 including a plurality of holes which are regularly aligned; and a hydrogen ion transporting material 120 introduced into the holes of the porous thin film. The hydrogen ion transporting material 120 may include any material without specific limitation as long as it has been typically used in the art to transport protons, and may include, for example, but may not be limited to, NAFION® or polyether ether ketone (PEEK). The porous thin film 110 including a plurality of holes which are regularly aligned may be formed of various materials. By way of example, the thin film may be, but may not be limited to, an organic thin film, an inorganic thin film, or an organic-inorganic hybrid thin film.

Figure 2:
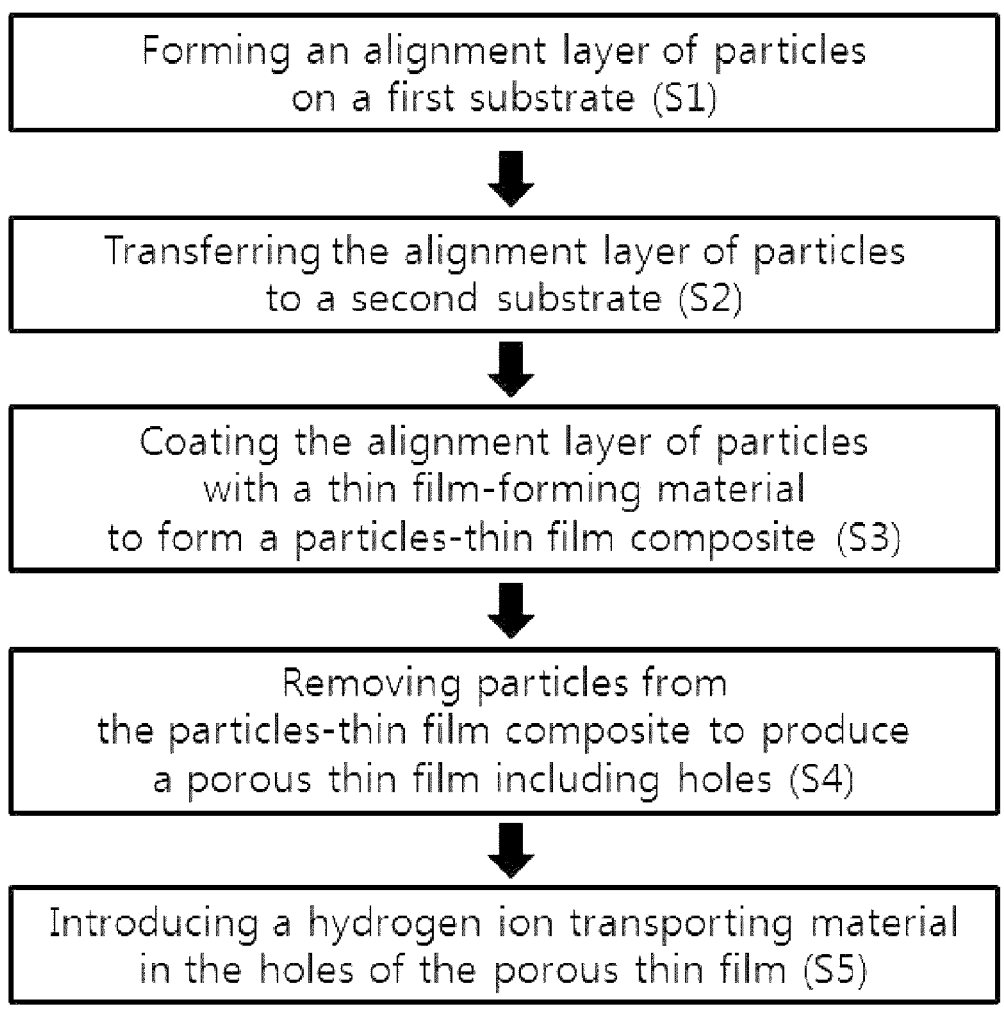
FIG. 2 is a flow chart showing a preparing method of a membrane for transporting hydrogen ion in accordance with an illustrative embodiment of the present disclosure.
Figure 3:
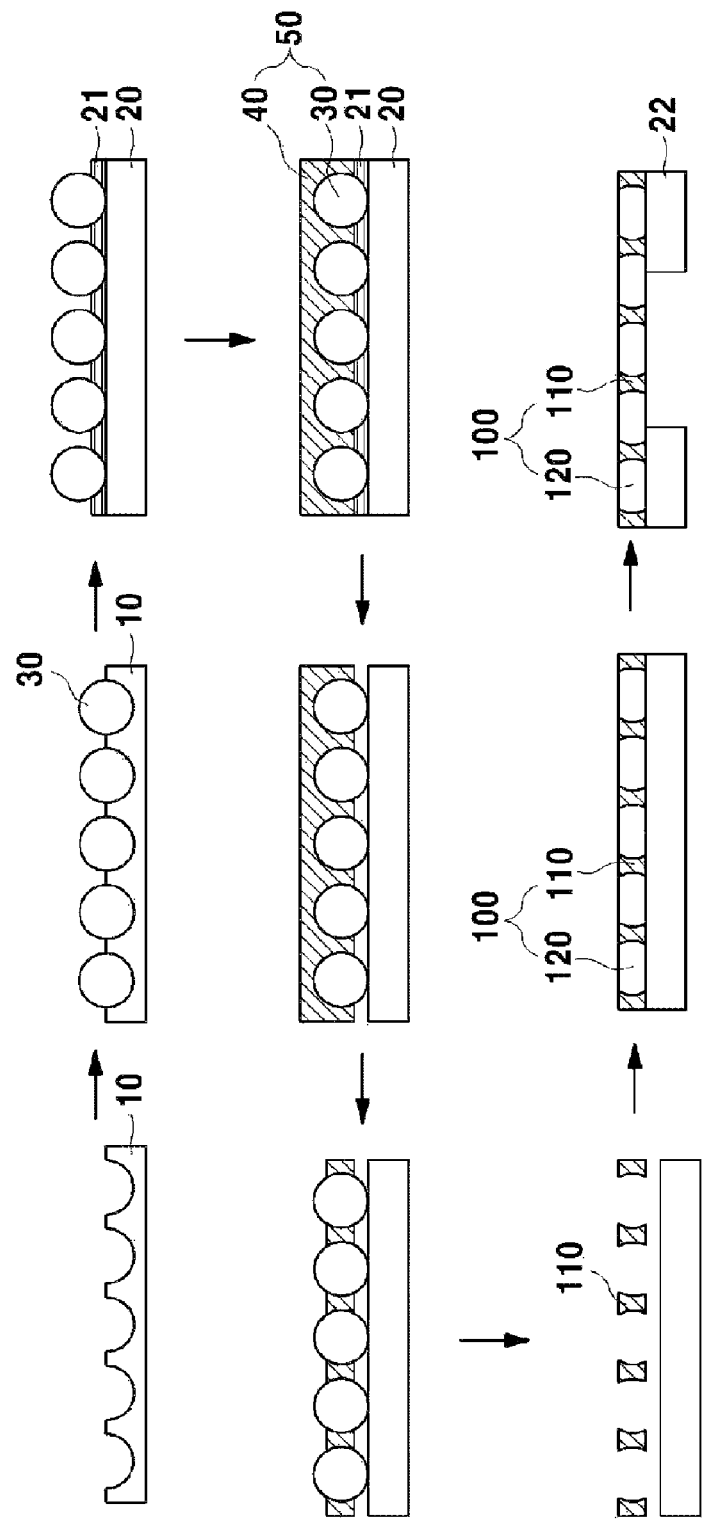
FIG. 3 provides cross-sectional views showing a preparing method of a membrane for transporting hydrogen ion in accordance with an illustrative embodiment of the present disclosure.

Referring to FIG. 2 and FIG. 3, in accordance with an illustrative embodiment of a preparing process of the membrane for transporting hydrogen ion 100, the preparing process may include: forming an alignment layer of particles 30 on a first substrate 10 (S1); transferring the alignment layer of particles 30 onto a second substrate 20 (S2); coating the alignment layer of particles 30 on the second substrate 20 with a thin film forming material 40 to form a particle-thin film composite 50 (S3); removing particles from the particle-thin film composite 50 to produce a porous thin film 110 including holes (S4); and introducing a hydrogen ion transporting material 120 into the holes of the porous thin film 110 (S5).

First of all, the alignment layer of particles 30 is formed on the first substrate 10 (S1). Conventionally, in order to form an alignment layer of particles, particles are dispersed in a solvent and then the particles are self-assembled to form an alignment layer. However, unlike this method, in the present disclosure, a physical pressure such as a rubbing is applied to the particles and the particles can be aligned on a substrate. Thus, it is not necessary to precisely control a temperature and humidity required for self-assembly of the particles in the solvent, and the particles on a surface of the substrate can be moved rapidly in a desired direction. Therefore, it is possible to suppress effects of surface properties (for example, a hydrophobic property, electric charges, and roughness) on movement of the particles on the substrate. Further, if a pattern is formed on the substrate, according to the conventional method using the particles dispersed in the solvent, the particles are hardly inserted into micropores formed by the pattern due to a capillary phenomenon of the solvent, and, thus, insertion of the particles becomes irregular. Meanwhile, according to the present disclosure, since a physical pressure is applied to the particles to be directly inserted into micropores, the particles can be inserted into all of the micropores, and a particle aligning method of the present disclosure has a greater tolerance than an aligning method by self-assembly with respect to a size and shape of the particles while the particles are aligned on the patterned substrate.

The rubbing refers to formation of physical or chemical bonds between the particle and the substrate by simply applying a physical pressure onto the particles. The chemical bond may include a hydrogen bond, an ionic bond, a covalent bond, a coordinate bond, or a van der Waals bond, and desirably, it may include an ionic bond or a hydrogen bond. The rubbing may be applied by, for example, but may not be limited to, a bare hand, a rubbing device, or a rubbing machine to apply a pressure to the particles.

If necessary, an adhesive layer 21 may be further formed on the first substrate. A non-limited example of an adhesive material forming the adhesive layer may include, but may not be limited to, PEI (polyethylene imine), polyacrylamide (PAM), Poly-DADMAC (diallyldimethyl ammonium chloride), PEO (polyethylene oxide), and the like.

Then, the alignment layer of particles 30 on the first substrate 10 is transferred onto the second substrate 20 (S2). The transfer of the alignment layer of particles 30 may include, but may not be limited to, bringing the alignment layer of particles 30 on the first substrate 10 into contact with the second substrate 20 on which the adhesive layer 21 is formed and transferring the alignment layer of particles 30 onto the second substrate 20 by adhesive strength of the adhesive material. As depicted in FIG. 3, if necessary, the adhesive layer 21 may be additionally formed on the second substrate, and the adhesive material has a function to readily attach the particles onto the first substrate or the second substrate. The adhesive layer formed on the second substrate include all the descriptions about the above-described adhesive layer 21 on the first substrate 10, and redundant descriptions thereof will be omitted for convenience. Thereafter, the alignment layer of particles 30 on the second substrate 20 are coated with the thin film forming material 40 to form the particle-thin film composite 50 (S3). In order to form the composite 50, all of the particles may be coated with the thin film forming material 40, but the present disclosure may not be limited thereto. If necessary, a portion of the particles may be coated with the thin film forming material 40. The coating method may include any coating method without specific limitation as long as it is typically used in the art. By way of example, the thin film forming material may be used for, but may not be limited to, deep coating or spin coating to form the composite. A thin film formed of the thin film forming material may include one selected from the group consisting of an organic thin film, an inorganic thin film, an organic-inorganic hybrid thin film, and combinations thereof. By way of example, the organic thin film may include one or more selected from the group consisting of polystyrene, polymethyl methacrylate (PMMA), polyacrylate, polyalphamethylstyrene, polybenzyl methacrylate, polyphenyl methacrylate, polydiphenyl methacrylate, polycyclo hexyl methacrylate, a styrene-acrylonitrile copolymer, and a styrene-methyl methacrylate copolymer. However, the present disclosure may not be limited thereto.

After the particle-thin film composite 50 is formed, the particles 30 are selectively removed from the composite 50 to form the porous thin film 110 including holes (S4). The method for forming the porous thin film 110 may include, but may not be limited to, exposing the particles 30 by etching and removing a part of the thin film forming material from the composite 50; and removing the exposed particles. Further, the method for etching the thin film may include all of dry etching methods or wet etching methods typically used in the art. By way of example, the thin film may be selectively removed by using an etching solution or the thin film may be etched by plasma etching (for example: $O_2$ plasma etching), but the present disclosure may not be limited thereto. The method for removing the particles may include any method without specific limitation as long as it is capable of selectively removing the particles. By way of example, the particles may be removed by a wet etching method using, but may not be limited to, an acidic solution.

If necessary, after the porous thin film 110 including holes is formed (S4) and before the hydrogen ion transporting material is introduced into the holes of the porous thin film 110 (S5), the preparing method may further include transferring the porous thin film 110 onto another substrate. The substrate may be, for example, but may not be limited to, a porous substrate, and the holes of the porous substrate may be equivalent to or greater than the holes of the porous thin film 110. Further, as described above, if the adhesive layer 21 is formed on the second substrate, before the porous thin film 110 is transferred onto the substrate, the adhesive layer 21 is removed, so that the porous thin film can be transferred more easily.

Finally, by introducing the hydrogen ion transporting material 120 such as NAFION® into the holes of the porous thin film 110 (S5), the membrane for transporting hydrogen ion 100 can be completed. Thus, it is possible to prepare a membrane for transporting hydrogen ion having a very regular structure in which a hydrogen ion transporting material is introduced into a plurality of holes which are regularly aligned.

If necessary, as depicted in FIG. 3, the membrane for transporting hydrogen ion can be transferred onto, but may not be limited to, a porous substrate 22. A size of the hole of the porous substrate 22 may include any size without specific limitation as long as it does not block passage of hydrogen ions onto the membrane for transporting hydrogen ion. By way of example, the hole of the porous substrate 22 may be larger than the hole of the porous thin film 110, but the present disclosure may not be limited thereto.

There has been explained the illustrative embodiment where the porous thin film has spherical holes, but the present disclosure may not be limited thereto. By way of example, the hole may have a symmetrical shape, a non-symmetrical shape, or an amorphous shape depending on a shape of the particle. A non-limited example thereof may include, but may not be limited to, a spherical shape, a semi-spherical shape, a cubic shape, a tetrahedral shape, a pentahedral shape, a hexahedral shape, a rectangular shape, an octahedral shape, a Y-shape, a pillar shape, a conic shape, and etc.

A method for forming a porous thin film including holes according to the above-described process (S1) to process (S4) can be carried out in association with the disclosure of Korean Patent Application No. 10-2010-0080868, and the entire disclosure of Korean Patent Application No. 10-2010-0080868 may be incorporated herein by reference.

Figure 4:
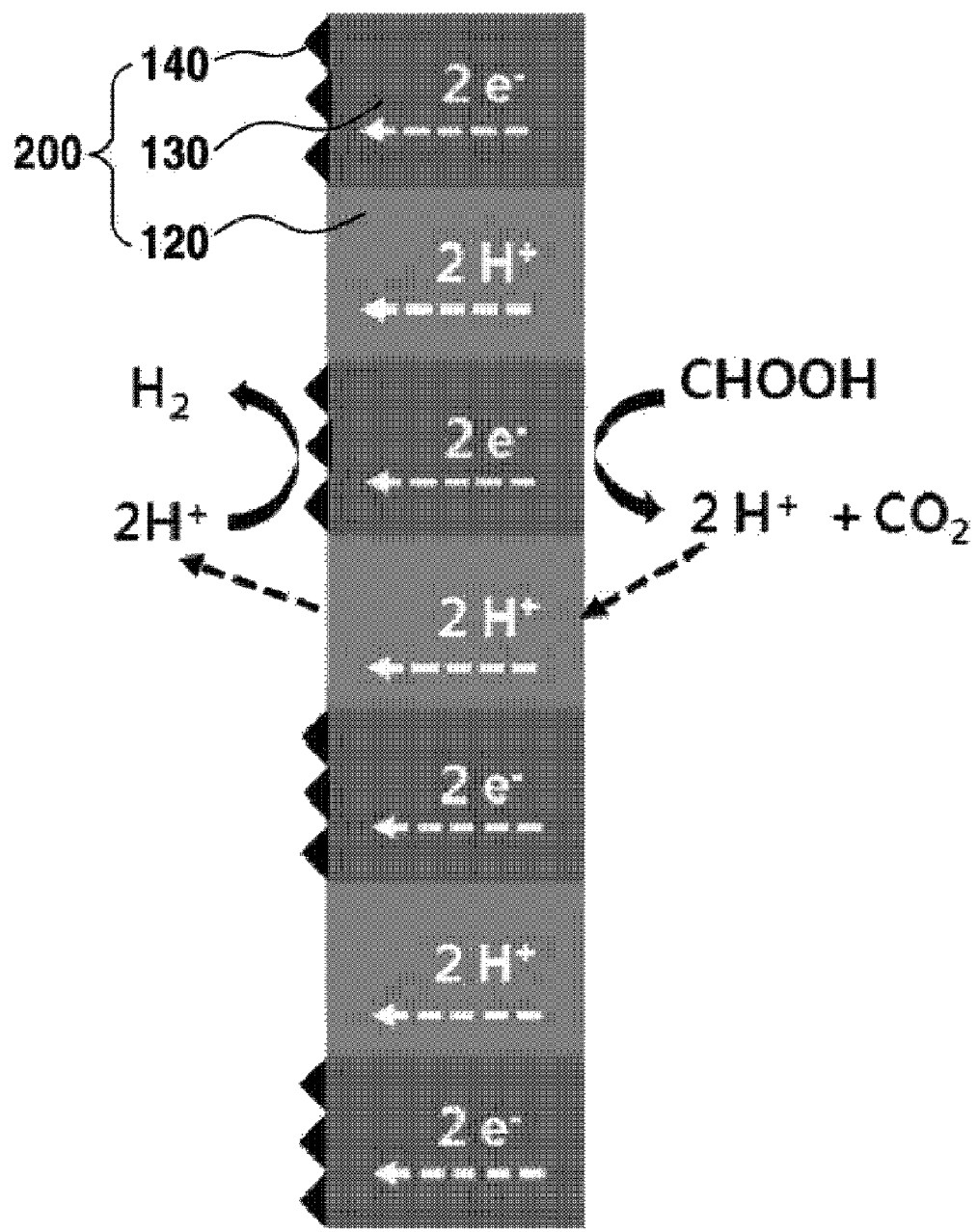
FIG. 4 is a cross-sectional view of a membrane for producing hydrogen in accordance with an illustrative embodiment of the present disclosure.

FIG. 4 is a cross-sectional view of a membrane for producing hydrogen 200 in accordance with the present disclosure. The membrane for producing hydrogen 200 includes a photocatalytic layer 130 including a plurality of holes which are regularly aligned; a hydrogen ion transporting material 120 introduced into the holes of the photocatalytic layer; and a co-catalyst layer 140 formed on a part except the holes of the photocatalytic layer.

In accordance with an illustrative embodiment, if light is irradiated onto the membrane for producing hydrogen 200, electrons and positive holes are generated in the photocatalytic layer 130 of the membrane 200. A hydrogen ion source positioned at one side of the membrane 200 produces hydrogen ions by the positive holes. The hydrogen ions produced as such are transferred to the other side of the membrane 200 through the hydrogen ion transporting material 120 of the membrane 200, and the electrons generated in the photocatalytic layer 130 are separated and transferred to the other side of the membrane 200 through the photocatalytic layer 130 and/or the co-catalyst layer 140 of the membrane 200. The transferred hydrogen ions are used to produce hydrogen on the other side of the membrane 200 through a reduction reaction using the transferred electrons. The hydrogen ion source may include water or an organic material. The organic material may include, but may not be limited to, a formic acid or the like as depicted in FIG. 4.

The photocatalytic layer 130 may be employed from those publicly known in the art as having a photo active property without specific limitation. By way of example, the photocatalytic layer 130 may include any photocatalytic layer without specific limitation as long as it has the activity of oxidizing water under light irradiation to produce oxygen and generate protons and electrons at the same time. By way of example, the photocatalytic layer 130 may include, but may not be limited to, one selected from the group consisting of metals, semiconductors, alloys, and combinations thereof that absorb visible light or ultraviolet light. To be specific, the photocatalytic layer 130 may use any material having a photo active property without specific limitation as long as its electrons (e−) can be excited from a covalent band to a conduction band and it has the activity of oxidizing water under light irradiation to produce oxygen and generate protons and electrons at the same time.

By way of example, the photocatalytic layer 130 may include any material publicly known in the art as having an ultraviolet light active property. To be specific, the photocatalytic layer 130 may include, but may not be limited to, one selected from the group consisting of $TiO_2$, B/Ti oxide, $CaTiO_3$, $SrTiO_3$, $SrTiO_3$, $Sr_3Ti_2O_7$, $Sr_4Ti_3O_{10}$, $K_2La_2Ti_3O_{10}$, $Rb_2La_2Ti_3O_{10}$, $Cs_2La_2Ti_3O_{10}$, $CsLa_2Ti_2NbO_{10}$, $La_2TiO_5$, $La_2Ti_3O_9$, $La_2Ti_2O_7$, $La_2Ti_2O_7$, $KaLaZr_{0.3}Ti_{0.7}O_4$, $La_4CaTi_5O_{17}$, $KTiNbO_5$, $Na_2Ti_6O_{13}$, $BaTi_4O_9$, $Gd_2Ti_2O_7$, $Y_2Ti_2O_7$, $ZrO_2$, $K_4Nb_6O_{17}$, $Rb_4Nb_6O_{17}$, $Ca_2Nb_2O_7$, $Sr_2Nb_2O_7$, $Ba_5Nb_4O_{15}$, $NaCa_2Nb_3O_{10}$, $ZnNb_2O_6$, $Cs_2Nb_4O_{11}$, $La_3NbO_7$, $Ta_2O_5$, $K_2PrTa_5O_{15}$, $K_3Ta_3Si_2O_{13}$, $K_3Ta_3B_2O_{12}$, $LiTaO_3$, $NaTaO_3$, $KTaO_3$, $AgTaO_3$, $KTaO_3$:Zr, $NaTaO_3$:La, $NaTaO_3$, $SrNa_2Ta_2O_6$, $K_2Ta_2O_6$, $CaTa_2O_6$, $SrTa_2O_6$, $BaTa_2O_6$, $NiTa_2O_6$, $Rb_4Ta_6O_{17}$, $Ca_2Ta_2O_7$, $Sr_2Ta_2O_7$, $K_2SrTa_2O_7$, $RbNdTa_2O_7$, $H_2La_{2/3}Ta_2O_7$, $K_2Sr_{1.5}Ta_3O_{10}$, $LiCa_2Ta_3O_{10}$, $KBa_2Ta_3O_{10}$, $Sr_5Ta_4O_{15}$, $Ba_5Ta_4O_{15}$, $H_{1.8}Sr_{0.81}Bi_{0.19}Ta_2O_7$, Mg—Ta oxide, $LaTaO_4$, $La_3TaO_7$, $PbWO_4$, $RbWNbO_6$, $RbWTaO_6$, $CeO_2$:Sr, $BaCeO_3$, and combinations thereof.

By way of example, the photocatalytic layer 130 may include any material publicly known in the art as having a visible light active property. To be specific, the photocatalytic layer 130 may include, but may not be limited to, one selected from the group consisting of $WO_3$, $Bi_2WO_6$, $Bi_2MoO_6$, $Bi_2MO_3O_{12}$, $Zn_3V_2O_8$, $Na_{0.5}Bi_{1.5}VMoO_8$, $In_2O_3(ZnO)_3$, $SrTiO_3$: Cr/Sb, $SrTiO_3$:Ni/Ta, $SrTiO_3$:Cr/Ta, $SrTiO_3$:Rh, $CaTiO_3$:Rh, $La_2Ti_2O_7$:Cr, $La_2Ti_2O_7$:Fe, $TiO_2$:Cr/Sb, $TiO_2$:Ni/Nb, $TiO_2$:Rh/Sb, $PbMoO_4$:Cr, $RbPb_2Nb_3O_{10}$, $PbBi_2Nb_2O_9$, $BiVO_4$, $BiCu_2VO_6$, $BiZn_2VO_6$, $SnNb_2O_6$, $AgNbO_3$, $Ag_3VO_4$, $AgLi_{1/3}Ti_{2/3}O_2$, $AgLi_{1/3}Sn_{2/3}O_2$, and combinations thereof.

In accordance with an example, the photocatalytic layer 130 may include, but may not be limited to, one selected from the group consisting of $TiO_2$, $SrTiO_3$, ZnO, CdS, and $SnO_2$.

The co-catalyst layer 140 serves as a co-catalyst that assists transfer of electrons formed by exposure of the photocatalytic layer 130 on one side of the membrane 200 to photoenergy to the other side of the membrane 200 and reduction of hydrogen ions ($H^+$) to generate hydrogen ($H_2$). The co-catalyst layer 140 may use one or more selected from the group consisting of Pt, Pd, Rh, Au, Ni, Cr, Ag, Cu, W, Mo, Nb, V, Ru, Sn, Zr, Co, Fe, Ta, and combinations thereof as particles of the co-catalyst layer 140. Further, the co-catalyst layer 140 may include any material without specific limitation as long as it serves as a co-catalyst for water photolysis using a photocatalyst. By way of example, the co-catalyst layer 140 may include, but may not be limited to, the above-described metals or $RuO_x$. The co-catalyst layer 140 may have any shape without specific limitation, and may have various shapes, for example, but may not be limited to, a triangular shape as depicted in FIG. 4, a nanorod shape, a nanodot shape, a quantum dot, or a thin film shape.

In accordance with an illustrative embodiment, the light may include visible light or ultraviolet light, and a light source may include, but may not be limited to, a halogen lamp, a high-pressure mercury lamp, a laser beam, a metal halogen lamp, a black lamp, an electrodeless lamp.

Although not illustrated in FIG. 4, the membrane for producing hydrogen 200 may be formed on a porous substrate. In this case, a hole of the porous substrate may have any size without specific limitation as long as it does not block movement of electrons and hydrogen ions through the membrane for producing hydrogen 200 and may be larger than a hole of the photocatalytic layer 130, but the present disclosure may not be limited thereto. By way of example, as the porous substrate, a substrate including a plurality of holes which are regularly aligned may be used.

Figure 5:
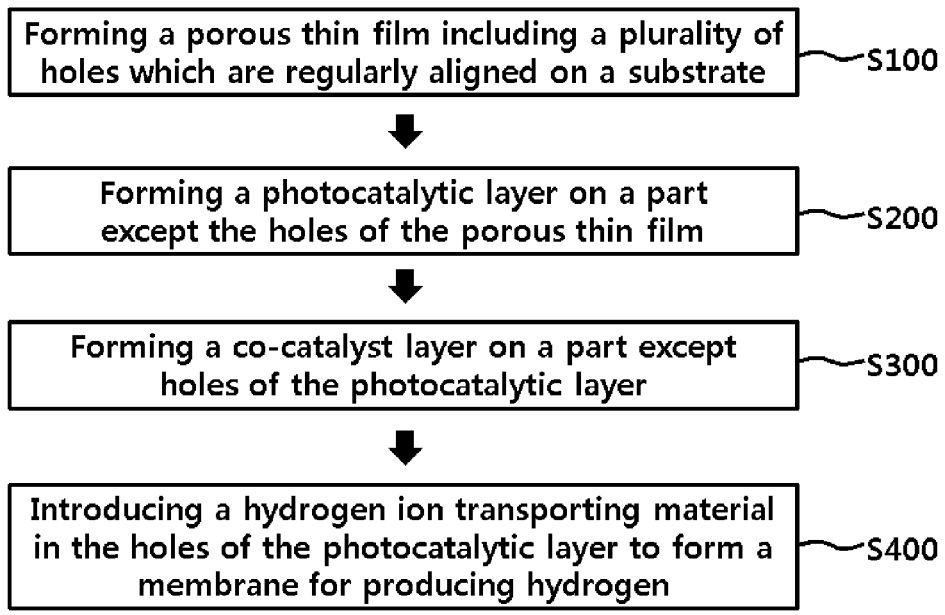
FIG. 5 is a flow chart showing a preparing method of a membrane for producing hydrogen in accordance with an illustrative embodiment of the present disclosure.
Figure 6A:
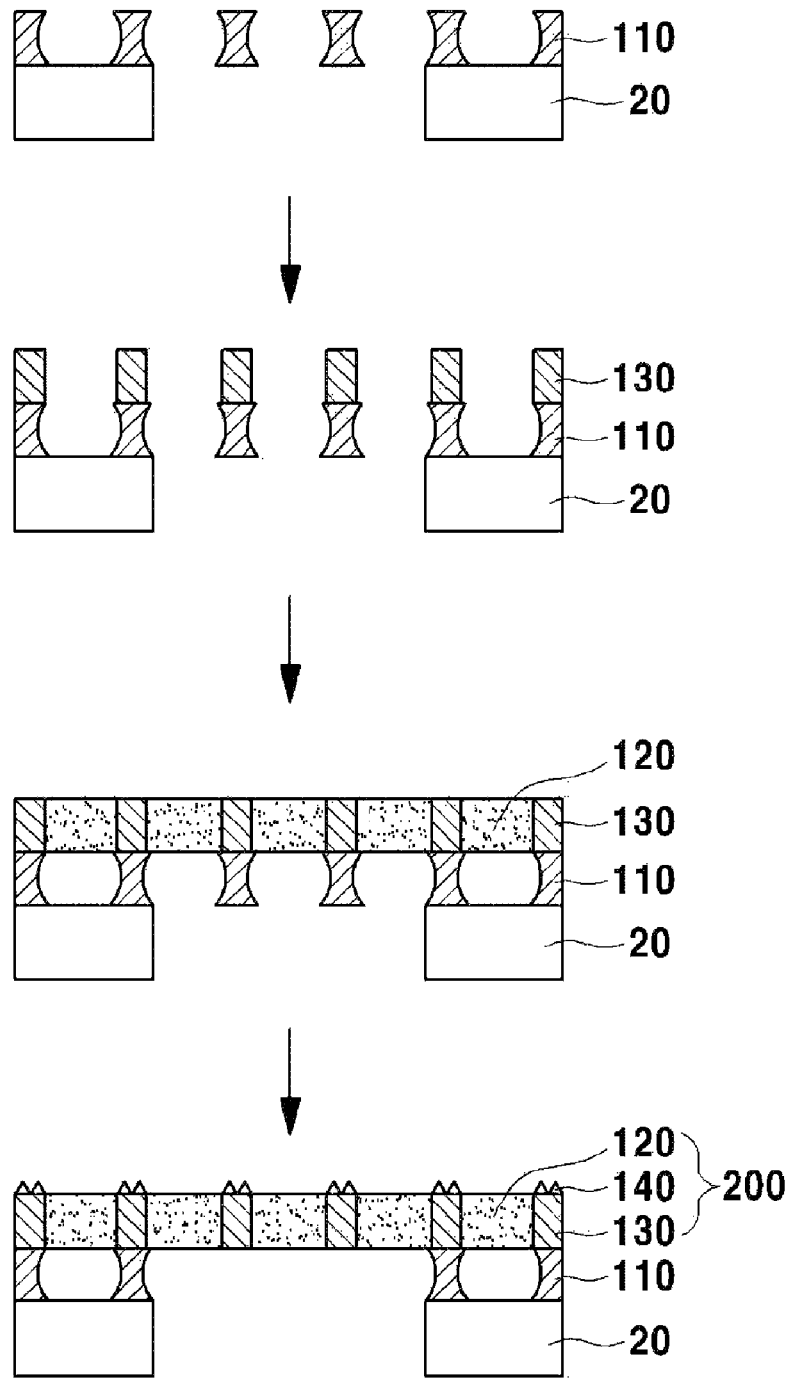
FIGS. 6A and 6B provide cross-sectional views showing a preparing method of a membrane for producing hydrogen in accordance with an illustrative embodiment of the present disclosure.
Figure 6B:
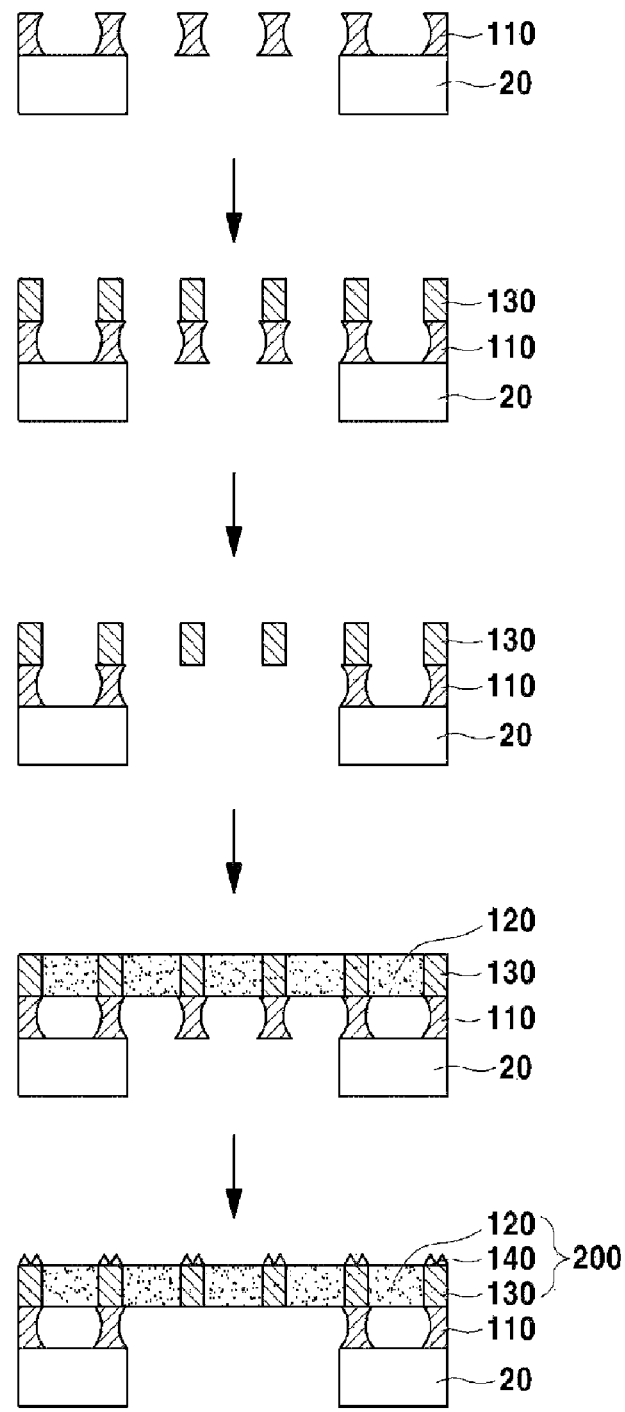

The membrane for producing hydrogen 200 can be prepared by using the above-described porous thin film including a plurality of holes which are regularly aligned. Referring to FIG. 5 and FIGS. 6A and 6B, in accordance with an illustrative embodiment of a preparing method of the membrane for producing hydrogen 200, the preparing method may include: forming the porous thin film 110 including a plurality of holes which are regularly aligned on the substrate 22 (S100); forming the photocatalytic layer 130 on a part except the holes of the porous thin film 110 (S200); forming the co-catalyst layer 140 on a part except holes of the photocatalytic layer 130 (S300); and introducing the hydrogen ion transporting material 120 into the holes of the photocatalytic layer 130 (S400) to form the membrane for producing hydrogen 200. If necessary, the forming the co-catalyst layer (140) on a part except holes of the photocatalytic layer 130 (S300) and the introducing the hydrogen ion transporting material 120 into the holes of the photocatalytic layer 130 (S400) may be carried out in reverse order.

The method for forming the photocatalytic layer 130 (S200) may include various methods for forming a layer such as coating methods and deposition methods typically used in the art without specific limitation. In accordance with an illustrative embodiment, the preparing method of the photocatalytic layer 130 may include, but may not be limited to, forming the photocatalytic layer 130 by depositing a photocatalytic layer on the porous thin film 110 including a plurality of holes which are regularly aligned. To be specific, the photocatalytic layer may be deposited first on a part except the holes of the porous thin film including the holes, or if the holes each having a size of the thin film are fine holes in several nanometer to several tens nanometer, the photocatalytic layer is not deposited on the holes of the thin film, and, thus, the photocatalytic layer can be selectively deposited on a part except the holes of the porous thin film including the holes. Therefore, the photocatalytic layer prepared by the above-described method also has a porous structure including holes like the thin film. The deposition methods are not specifically limited, and more desirably, the photocatalytic layer can be deposited by, but may not be limited to, a sputtering method.

If necessary, as depicted in FIG. 6B, the preparing method may further include selectively etching a part of the porous thin film 110. The etching a part of the porous thin film 110 can be carried out at any time without specific limitation as long as it is carried out before the forming of the membrane for producing hydrogen 200. By way of example, the etching a part of the porous thin film 110 may be carried out before form of the hydrogen ion transporting material 120 is introduced into the photocatalytic layer 130 or before the co-catalyst layer 140 is formed on the photocatalytic layer 130, but the present disclosure may not be limited thereto.

Figure 7:
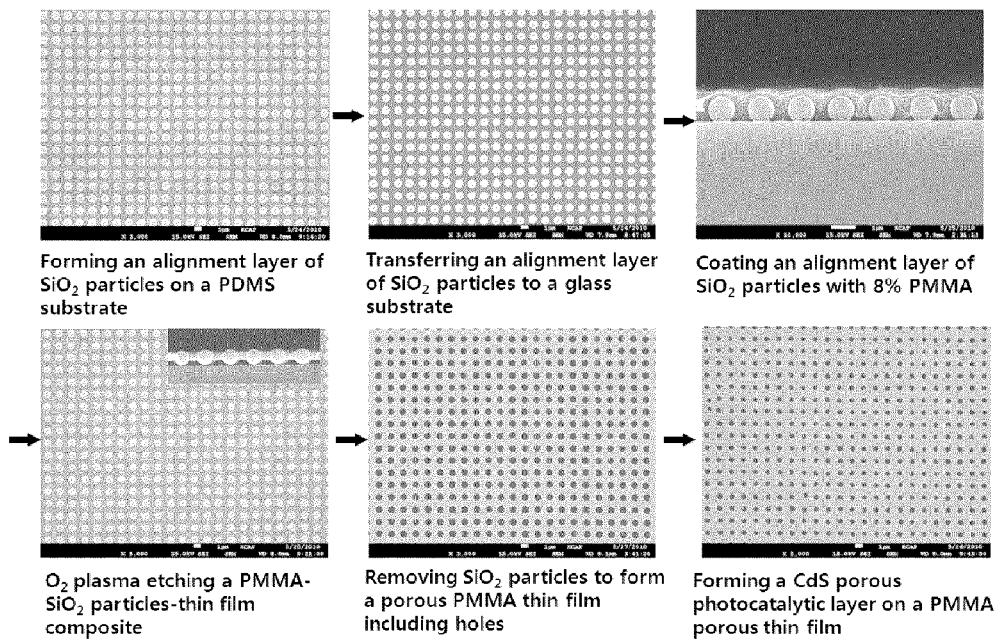
FIG. 7 is SEM (Scanning Electron Microscope) images showing a preparing process of a membrane for producing hydrogen in accordance with an example of the present disclosure.
Figure 9A:
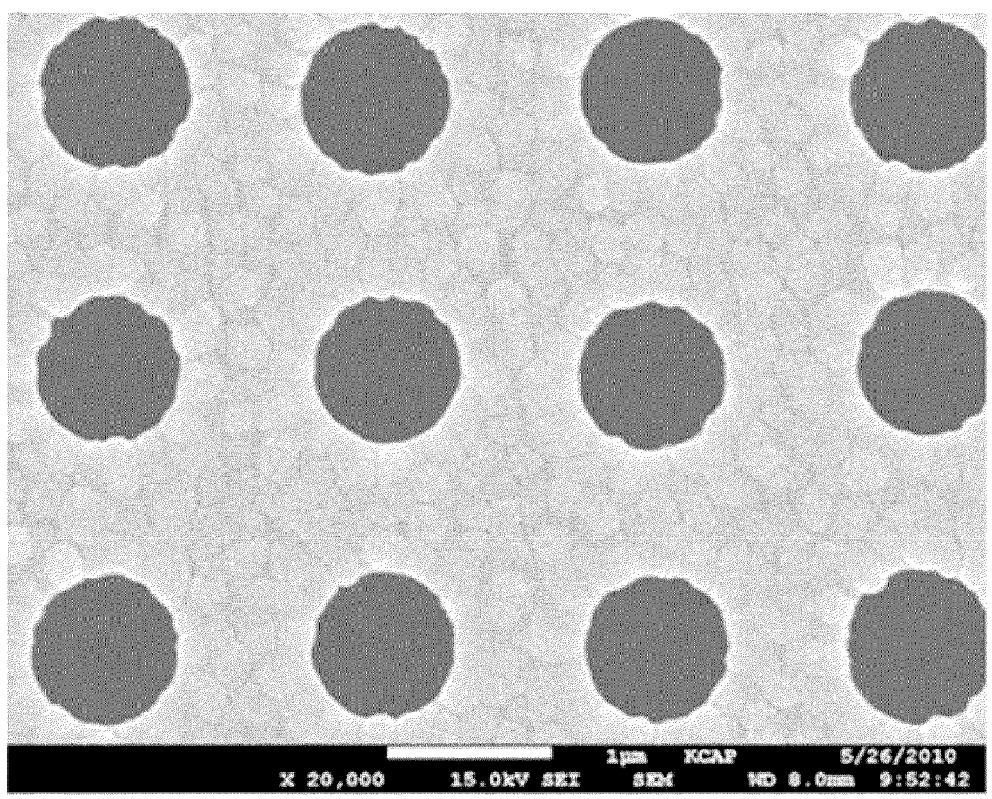
FIGS. 9A and 9B are SEM images obtained by XPS (X-ray Photoelectron Spectroscopy) of a photocatalytic layer formed on a porous thin film including holes in accordance with an example of the present disclosure.
Figure 9B:
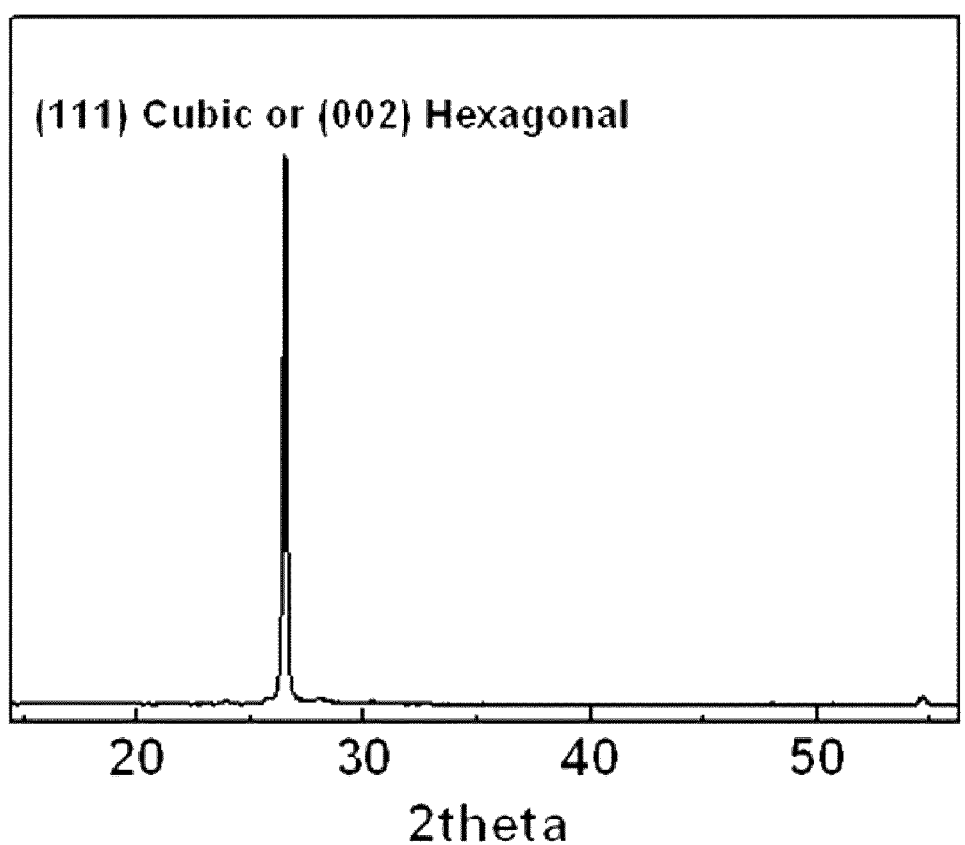

FIG. 7 and FIG. 8 provide SEM (Scanning Electron Microscope) images showing a preparing process of a membrane for producing hydrogen in accordance with an example of the present disclosure. To be specific, a CdS photocatalytic layer was formed by forming a porous thin film including holes and formed of PMMA (see FIG. 7 and left images in FIG. 8) and depositing a CdS photocatalytic layer on the porous thin film through a sputtering process (see FIG. 7 and right images in FIG. 8). It could be seen from FIG. 7 that holes of the CdS photocatalytic layer were very regularly aligned. Further, referring to FIGS. 9A to 9B, it could be observed by XPS (X-ray Photoelectron Spectroscopy) that the CdS photocatalytic layer was formed on the thin film including holes, which are made of PMMA.

Figure 10A:
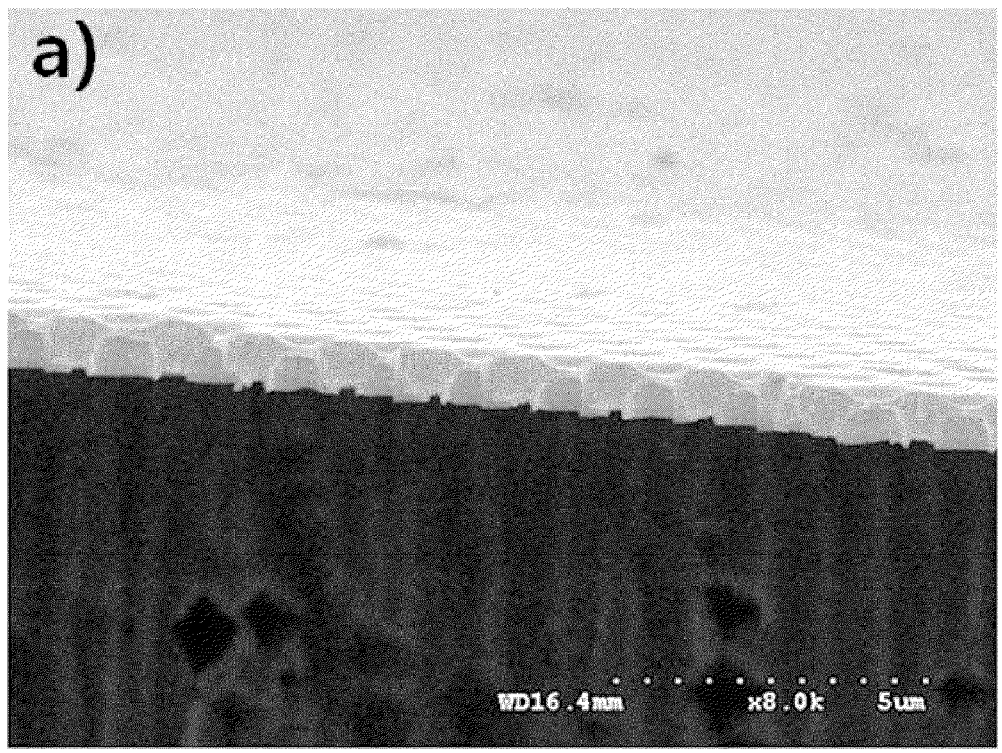
FIGS. 10A and 10B are photos of a cross section of a porous thin film into which NAFION® is introduced in accordance with an example of the present disclosure.
Figure 10B:
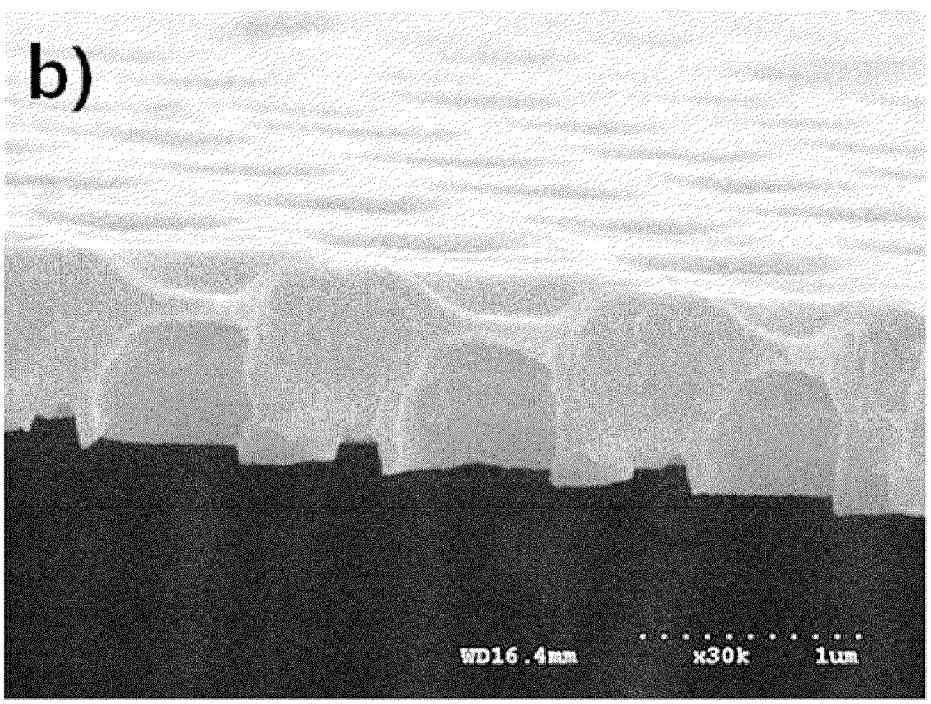

FIGS. 10A and 10B provide SEM images showing a cross section of a membrane for producing hydrogen formed by introducing NAFION® as a hydrogen ion transporting material into the holes of the CdS photocatalytic layer in accordance with an example of the present disclosure.

Figure 11:
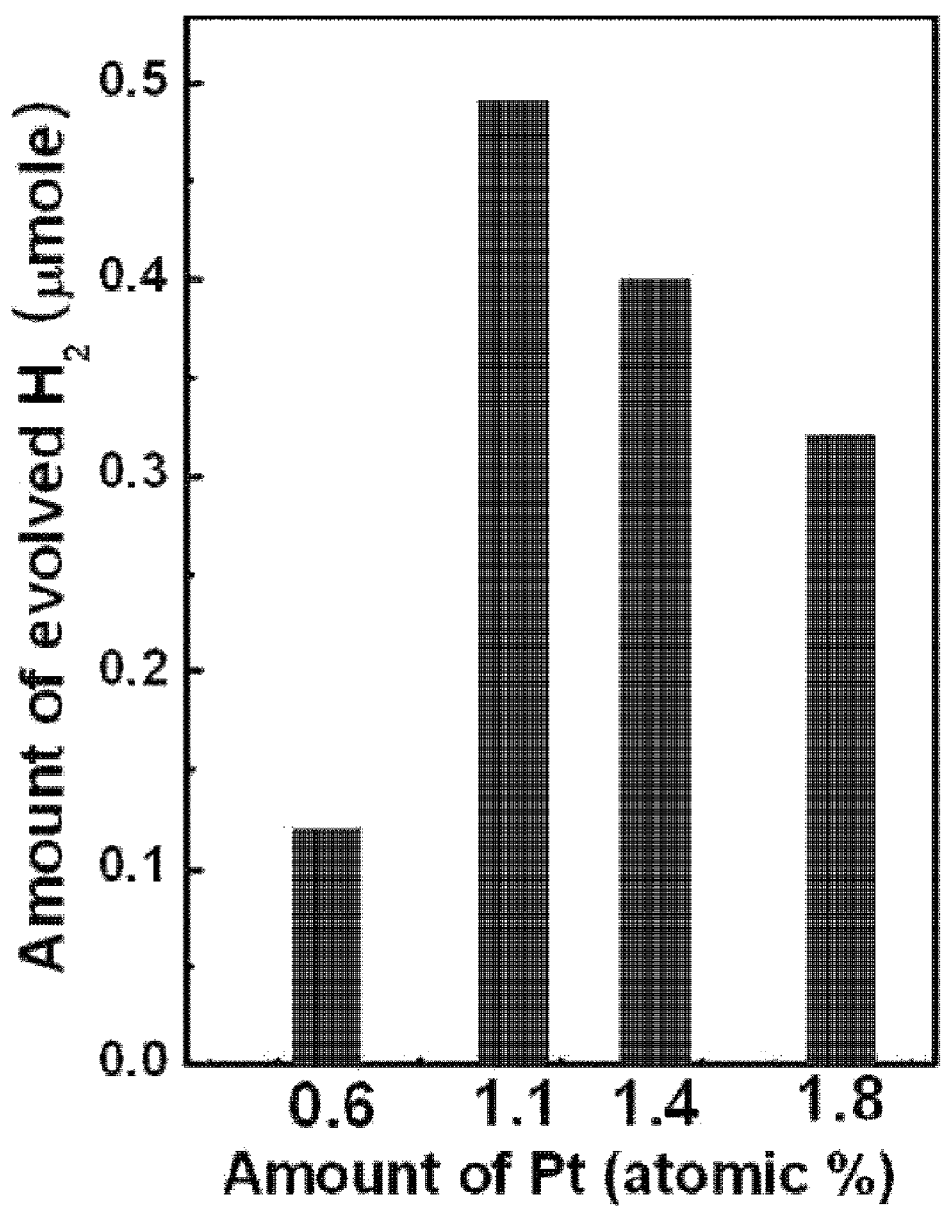
FIG. 11 shows a result of measurement on a hydrogen product amount of a membrane for producing hydrogen with different concentrations of a co-catalyst layer in accordance with an example of the present disclosure.

FIG. 11 shows a result of measurement on a hydrogen product amount depending on a thickness and/or an amount of a co-catalyst layer in accordance with an example of the present disclosure. To be more specific, referring to FIG. 11, it can be seen that an amount of hydrogen produced is changed by regulating an amount of a Pt co-catalyst layer formed on the CdS photocatalytic layer to from about 0.6 at. % to about 1.8 at. %.

Figure 12:
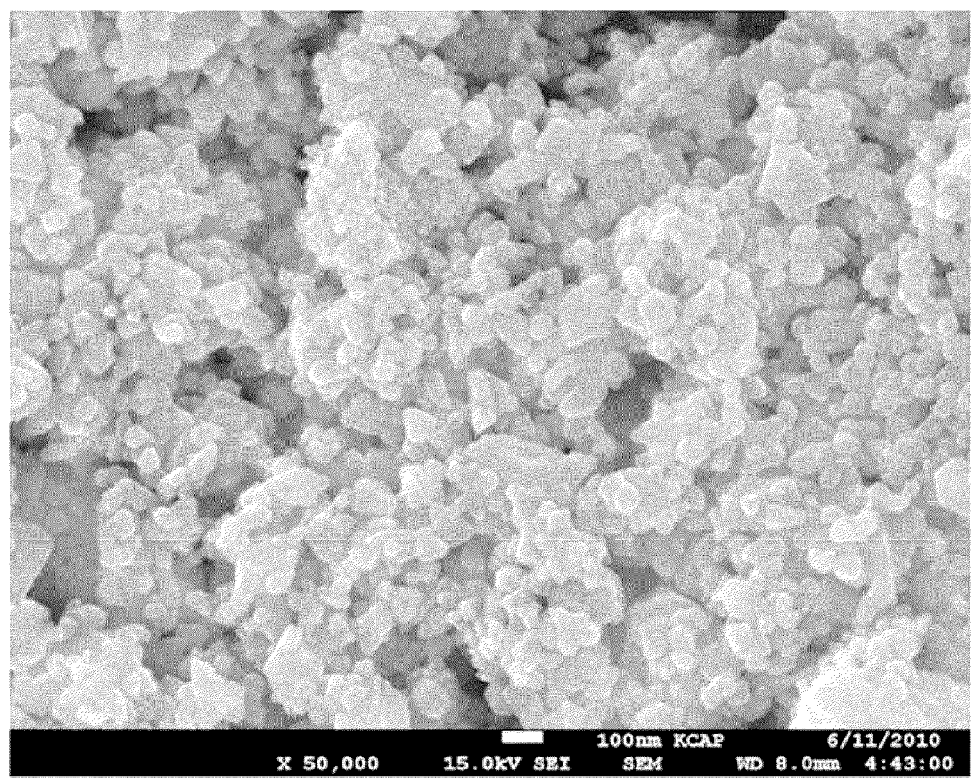
FIG. 12 is a SEM image of a photocatalytic layer in the form of powder in accordance with a comparative example of the present disclosure.
Figure 13:
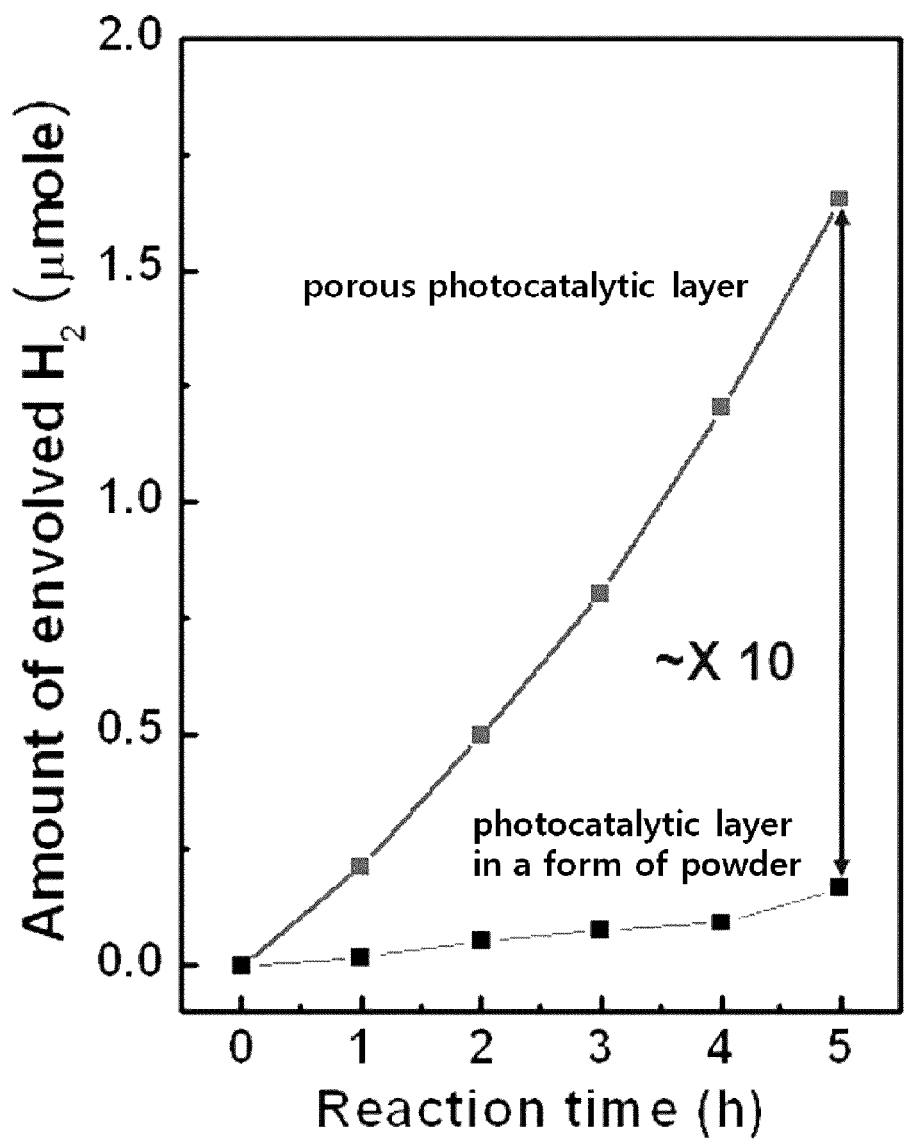
FIG. 13 shows a result of comparison in a hydrogen product amount between a photocatalytic layer in accordance with an example of the present disclosure and a photocatalytic layer in the form of powder.

FIG. 12 shows a photocatalytic layer in the form of powder in accordance with a comparative example of the present disclosure, and FIG. 13 shows a result of comparison in a hydrogen product amount between the case of using a porous photocatalytic layer in accordance with an example of the present disclosure and the case of using the photocatalytic layer in the form of powder as depicted in FIG. 12. Conditions were the same except the forms of the photocatalytic layers. To be more specific, 0.1 ml of a formic acid was used as a hydrogen ion source and a visible light (sun light) of 100 mW/cm$^2$ was irradiated to each membrane for from about 1 hour to about 5 hours, and amounts of H$^2$ produced were monitored and compared. As depicted in FIG. 13, it could be seen that the porous photocatalytic layer produced more hydrogen than the CdS (0.1 mg) photocatalytic layer in the form of powder, and as a reaction time was increased, a difference in amount was increased. By way of example, after the reaction for about 5 hours, it could be seen that hydrogen product amounts of the case of using the photocatalytic layer and the case of using the photocatalytic layer in the form of powder were about 1.6 μmol/h and about 0.15 μmol/h, respectively, i.e. there was about a tenfold difference therebetween.

Although there has been explained the present disclosure with reference to the illustrative embodiments and examples, it would be understood by those skilled in the art that various changes and modifications may be made without changing technical conception and essential features of the present disclosure as described in the accompanying claims.

EXPLANATION OF CODES

10: First substrate
20: Second substrate
21: Adhesive layer
22: Porous substrate
30: Particles or alignment layer of particles
40: Thin film forming material
50: Particles-thin film composite
100: Membrane for transporting hydrogen ion
110: Porous thin film including a plurality of holes which are regularly aligned
120: Hydrogen ion transporting material
130: Photocatalytic layer including a plurality of holes which are regularly aligned
140: Co-catalyst layer
200: Membrane for producing hydrogen

What is claimed is:

1. A membrane for transporting hydrogen ion, comprising:
   a porous thin film including a plurality of holes which are regularly aligned and have uniform spacing between the holes;
   a hydrogen ion transporting material introduced into the holes of the porous thin film; and
   a porous substrate beneath the porous thin film,
   wherein the hydrogen ion transporting material includes a perfluorinated sulfonic acid polymer or a polyether ether ketone, and
   wherein the porous thin film includes an organic thin film or an organic-inorganic hybrid thin film.

2. The membrane for transporting hydrogen ion of claim 1, wherein holes in the porous substrate are larger than the holes of the porous thin film.

3. The membrane for transporting hydrogen ion of claim 1, wherein the porous substrate includes a glass, a fused silica wafer, a silicon wafer, or a photoresist.

4. The membrane for transporting hydrogen ion of claim 1, wherein a size of the holes of the porous thin film is from 10 nm to 100 μm.

5. The membrane for transporting hydrogen ion of claim 1, wherein the porous thin film has at least two types of holes which are different from each other in terms of a shape and/or a size.

6. A membrane for producing hydrogen, comprising:
   a photocatalytic layer including a plurality of holes which are regularly aligned and have uniform spacing between the holes;
   a hydrogen ion transporting material introduced into the holes of the photocatalytic layer;
   a co-catalyst layer formed on a part except the holes of the photocatalytic layer, and
   a porous substrate beneath the photocatalytic layer,
   wherein the hydrogen ion transporting material includes a perfluorinated sulfonic acid polymer or a polyether ether ketone.

7. The membrane for producing hydrogen of claim 6, wherein the co-catalyst layer includes a member selected from the group consisting of Pt, Pd, Rh, Au, Ni, Cr, Ag, Cu, W, Mo, Nb, V, Ru, Sn, Zr, Co, Fe, Ta, and combinations thereof.

8. The membrane for producing hydrogen of claim 6, wherein the photocatalytic layer includes a member selected from the group consisting of a metal, a semiconductor, an alloy, and combinations thereof absorbing visible light or ultraviolet light.

9. The membrane for producing hydrogen of claim 6, wherein holes of the porous substrate are larger than the holes of the photocatalytic layer.

10. The membrane for producing hydrogen of claim 6, wherein a size of the holes of the photocatalytic layer is from 10 nm to 100 μm.

11. A preparing method of a membrane for producing hydrogen, comprising:
    aligning a layer of particles on a first substrate by applying a physical pressure via rubbing the particles against the first substrate;
    transferring the aligned layer of the particles to a second substrate;
    coating the aligned layer of the particles on the second substrate with a thin film-forming material to form a particle-thin film composite;

removing the particles from the particle-thin film composite to form a porous thin film including a plurality of holes which are regularly aligned on a substrate and have uniform spacing between the holes;

forming a photocatalytic layer on a part except the holes of the porous thin film;

forming a co-catalyst layer on a part except in holes of the photocatalytic layer; and introducing a hydrogen ion transporting material into the holes of the photocatalytic layer to form a membrane for producing hydrogen.

12. The preparing method of a membrane for producing hydrogen of claim 11, further comprising:

separating the formed membrane for producing hydrogen from the porous thin film.

13. The preparing method of a membrane for producing hydrogen of claim 11, further comprising:

etching a part of the porous thin film beneath the photocatalytic layer before forming the membrane for producing hydrogen.

14. The preparing method of a membrane for producing hydrogen of claim 11, further comprising:

repeating forming the porous thin film including the plurality of holes which are regularly aligned on the substrate; forming the photocatalytic layer on a part except the holes of the porous thin film; forming the co-catalyst layer on a part except the holes of the photocatalytic layer; and introducing a hydrogen ion transporting material in the holes of the photocatalytic layer, to form a plurality of the membranes for producing hydrogen, then stacking the membranes for producing hydrogen to form a multi-layered membrane for producing hydrogen.

15. A cell for producing hydrogen, comprising:

a membrane for producing hydrogen according to claim 6.

16. An apparatus for artificial photosynthesis, comprising:

a membrane for producing hydrogen according to claim 6.

* * * * *